(12) United States Patent
Blodgett, Jr.

(10) Patent No.: US 7,240,938 B1
(45) Date of Patent: Jul. 10, 2007

(54) SLIDE MECHANISM WITH ELEVATION ADJUSTMENT

(75) Inventor: Raymond W. Blodgett, Jr., Norco, CA (US)

(73) Assignee: RBW Industries, Inc., Chino, CA (US)

( * ) Notice: Subject to any disclaimer, the term of this patent is extended or adjusted under 35 U.S.C. 154(b) by 96 days.

(21) Appl. No.: 10/914,567

(22) Filed: Aug. 9, 2004

Related U.S. Application Data

(60) Provisional application No. 60/566,738, filed on Apr. 30, 2004, provisional application No. 60/493,291, filed on Aug. 7, 2003.

(51) Int. Cl.
*B60P 3/34* (2006.01)

(52) U.S. Cl. .............. 296/26.01; 296/26.04; 296/26.05; 296/165

(58) Field of Classification Search ......... 296/26.01, 296/26.03, 26.12, 26.13, 165, 170, 171, 175; 52/67
See application file for complete search history.

(56) References Cited

U.S. PATENT DOCUMENTS

| 3,106,750 A | 10/1963 | Jarman |
| 5,491,933 A | 2/1996 | Miller et al. |
| 5,577,351 A * | 11/1996 | Dewald et al. .................. 52/67 |
| 5,706,612 A * | 1/1998 | Tillett ............................. 52/67 |
| 5,788,306 A * | 8/1998 | DiBiagio et al. ......... 296/26.02 |
| 5,915,774 A * | 6/1999 | Tiedge .................... 296/26.13 |
| 6,108,983 A * | 8/2000 | Dewald et al. ................. 52/67 |
| 6,109,683 A | 8/2000 | Schneider |
| 6,286,883 B1 * | 9/2001 | Schneider et al. ........ 296/26.14 |
| 6,293,611 B1 | 9/2001 | Schneider et al. |
| 6,619,714 B2 | 9/2003 | Schneider et al. |
| 7,066,528 B1 * | 6/2006 | Crean ......................... 296/175 |
| 2002/0180232 A1 | 12/2002 | Schneider et al. |
| 2004/0174031 A1 | 9/2004 | Rasmussen |

* cited by examiner

*Primary Examiner*—D. Glenn Dayoan
*Assistant Examiner*—Greg Blankenship
(74) *Attorney, Agent, or Firm*—Inskeep IP Group, Inc.

(57) ABSTRACT

The present invention provides a slide-out mechanism that adjusts the elevation of a slide-out room relative to the main body of a vehicle. In one preferred embodiment, the slide-out mechanisms includes an acme screw elevator on a telescoping support arm below the slide-out room. As the slide-out room extends or retracts, the acme screw elevator increases or decreases the height of the slide-out room so as to allow full retraction within the vehicle body and complete level extension.

28 Claims, 4 Drawing Sheets

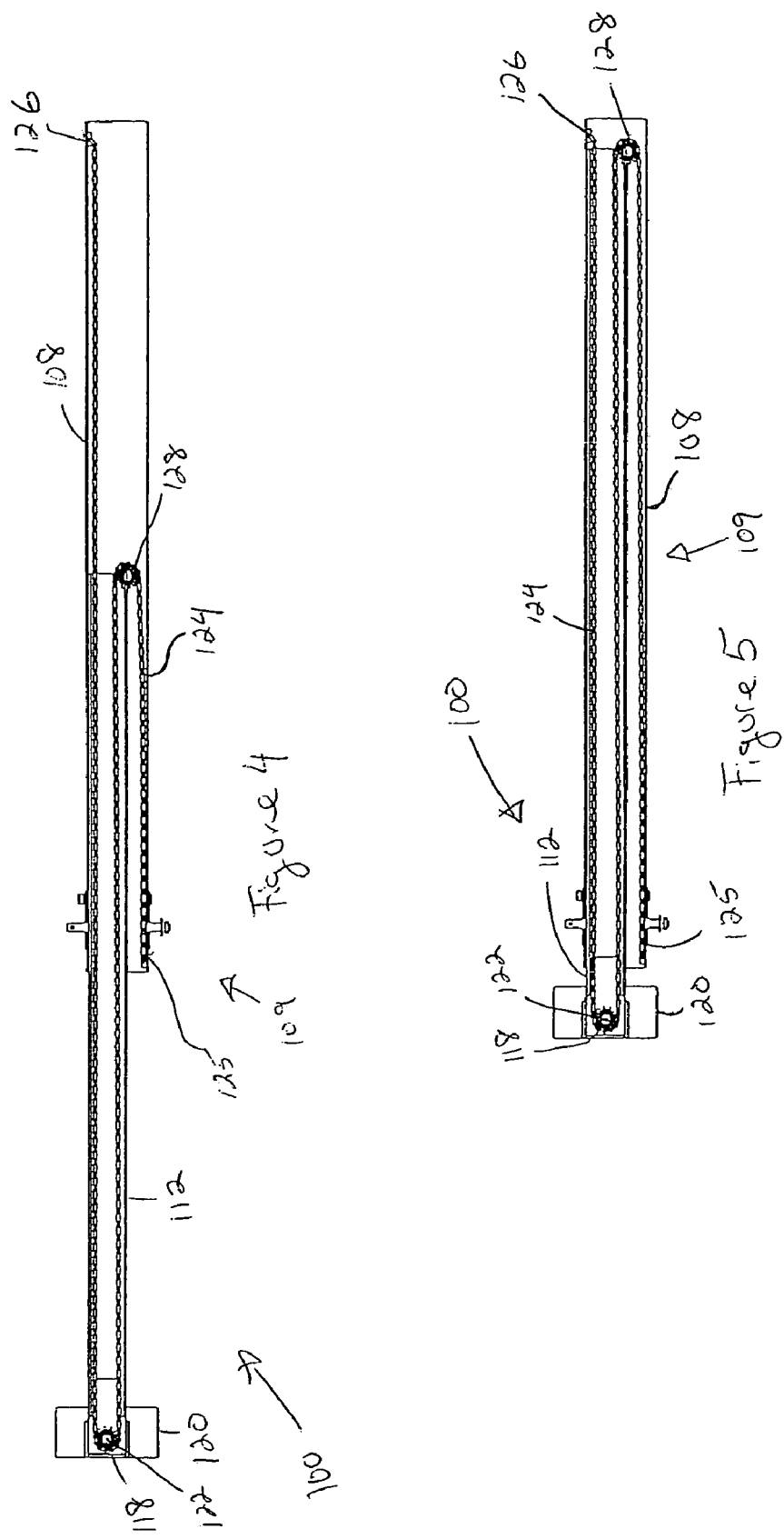

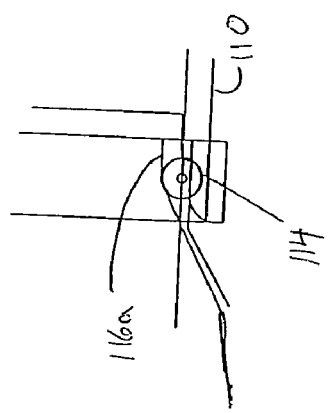
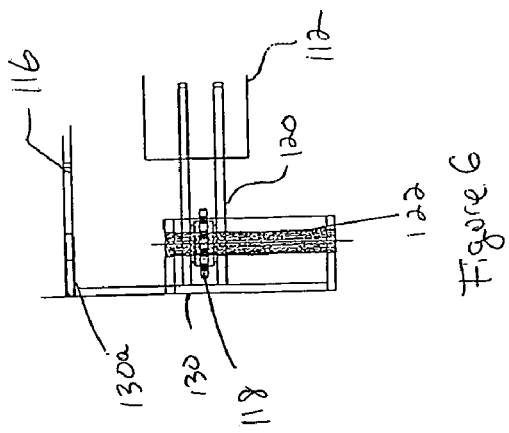
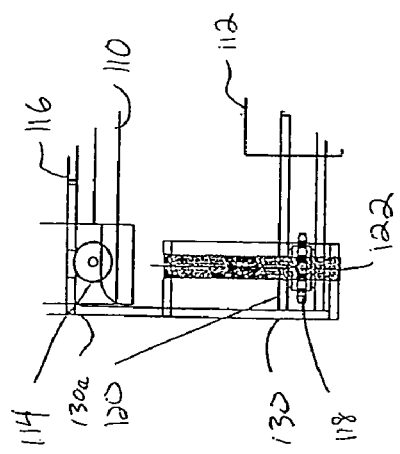
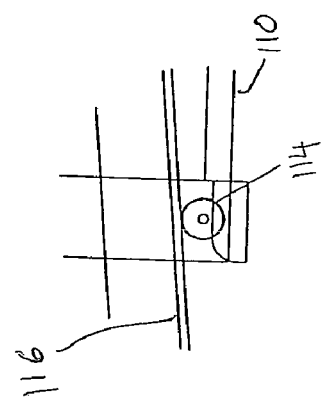
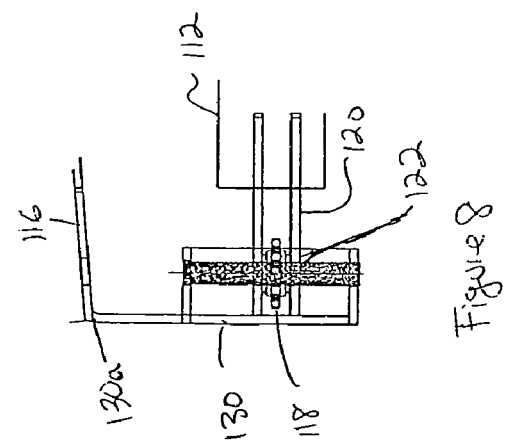

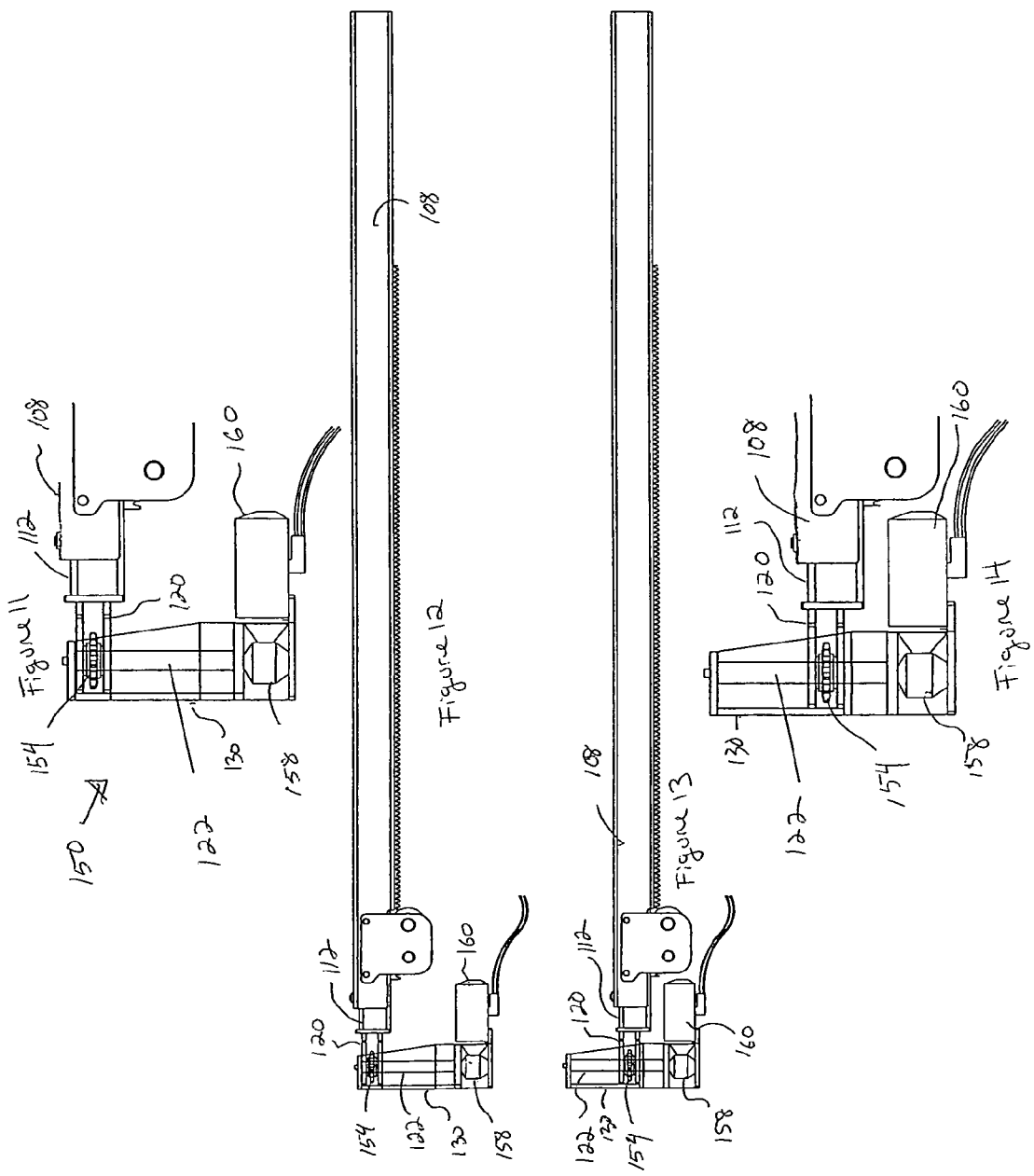

SLIDE MECHANISM WITH ELEVATION ADJUSTMENT

CROSS REFERENCE TO RELATED APPLICATIONS

This application claims the benefit of U.S. Provisional Application 60/493,291, entitled Slide Mechanism With Elevation Adjustment, filed Aug. 7, 2003, and U.S. Provisional Application 60/566,738, entitled Slide Mechanism With Elevation Adjustment, filed Apr. 30, 2004, the entire contents of which are hereby incorporated by reference.

FIELD OF INVENTION

This invention relates broadly to slide-out rooms. More particularly, this invention relates to a mechanism for adjusting the elevation of a slide-out room typically used in travel trailers, fifth wheel travel trailers, motor homes, and other recreational travel vehicles.

BACKGROUND OF THE INVENTION

In order to increase the available interior space of a motorized or towable vehicle such as a motor home or trailer, these vehicles have been designed to include slide-out rooms. When the vehicle is in transit, the slide-out room is retracted and stored in the vehicle's interior with the exterior wall of the slide-out room approximately flush with the vehicle's exterior. As a result, there is typically adequate space within the vehicle's interior to accommodate users in transit and remain within the standard width limitations imposed upon a vehicle. When the vehicle is parked and leveled, the slide-out room is then slid outward through an opening formed in a sidewall of the vehicle thereby, increasing the internal accommodations.

Typically, slide-out rooms include a floor section, a roof section, a first sidewall section, a second sidewall section, and a third sidewall section. In the retracted position, the roof section and the first and second sidewall section are concealed from exterior view, and the third sidewall section forms a portion of the vehicle's sidewall. At the same time, the floor section of the slide-out room typically rests above a floor section of a fixed room and may form a portion of the usable interior floor during vehicle transit. Similarly, the roof section of the slide-out room may define the interior ceiling of that part of the vehicle during transit. The proximal ends of the roof section, first sidewall section, and second sidewall section, include stop walls. As used herein, "proximal" refers to the portion towards the vehicle body and "distal" refers to the portion away from the vehicle body. The stop walls form an L-shaped configuration with the respective roof section, first sidewall section and second sidewall section. The stop walls engage the inner surface of a respective sidewall section of the fixed room when the slide-out room is fully extended, and thereby limit the travel of the slide-out room.

In the early phases of slide-out room design, the floor of the slide-out room would slide back and forth over the top of the interior vehicle floor. With these early designs, however, there would then always exist a step differential between the vehicle floor and the slide-out room floor, even when the slide-out room was fully extended. To some users, this type of design was inconvenient or unsightly.

As a result, later slide-out rooms were designed so that the slide-out room floor would become flush with the interior vehicle floor once the slide-out room was fully extended out from the vehicle. These designs become known as flush floor designs and examples of these designs can be found in U.S. Pat. Nos. 6,637,794, 6,598,354, and 5,577,351, each of which is hereby incorporated herein by reference.

However, even these later flush floor slide-out designs have not perfected the goal of achieving a flush floor configuration. For example, some existing flush floor slide-out designs are too complicated or cause excessive wear of parts over time. As a result, there is a continuing desire in the industry to find yet a better and more efficient way of achieving a flush floor configuration.

BRIEF SUMMARY OF THE INVENTION

It is an object of the present invention to overcome the limitations of the prior art and provide an improved way of achieving a flush floor configuration in a vehicle slide-out.

It is another object of the present invention to provide a slide-out mechanism that adjusts the elevation of a slide-out room.

It is another object of the present invention to provide a slide-out room that reduces its height when extended.

It is another object of the present invention to provide a slide-out room having a floor substantially level with a main floor of the vehicle body when in an extended position.

To achieve these and other objects not specifically numerated here, the present invention provides a slide-out mechanism that adjusts the elevation of a slide-out room relative to the main body of a vehicle. In one preferred embodiment, the slide-out mechanisms includes an acme screw elevator on a telescoping support arm below the slide-out room. As the slide-out room extends or retracts, the acme screw elevator increases or decreases the height of the slide-out room so as to allow full retraction within the vehicle body and complete level extension.

BRIEF DESCRIPTION OF THE DRAWINGS

FIGS. 4 and 5 illustrate a bottom plan view of a slide-out arm according to the present invention;

FIG. 6 illustrates a side view of an acme screw and sprocket according to the present invention;

FIG. 7 illustrates a side view of a slide-out roller according to the present invention;

FIG. 8 illustrates a side view of the acme screw and sprocket of FIG. 6;

FIG. 9 illustrates a side view of the slide-out roller of FIG. 7;

FIG. 10 illustrates a side view of the acme screw and sprocket of FIG. 6;

FIG. 11 illustrates a side view of a motorized acme screw according to the present invention;

FIGS. 12 and 13 illustrate a side view of a slide-out arm according to the present invention; and FIG. 14 illustrates a side view of the motorized acme screw of FIG. 11.

DETAILED DESCRIPTION OF THE INVENTION

Figure 3:
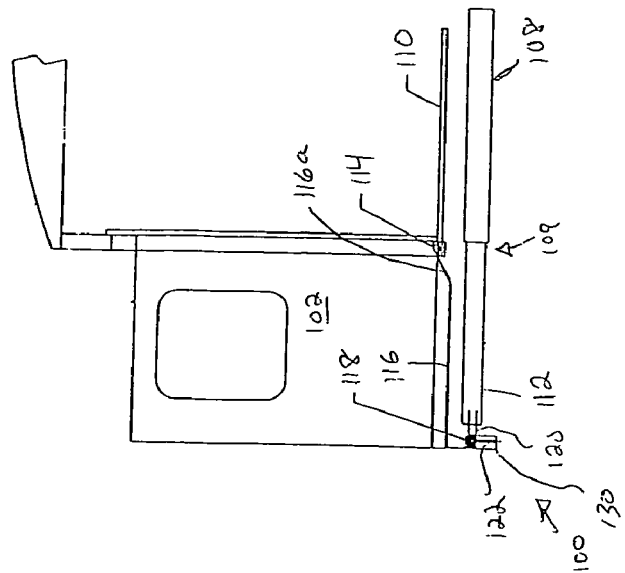
FIGS. 1-3 illustrates a side view of a slide-out mechanism according to the present invention.

FIGS. 1-10 illustrate a preferred embodiment of the elevation adjusting slide-out mechanism 100 according to the present invention. The elevation adjusting slide-out mechanism 100 includes a slide-out arm 109 that moves a distal portion of the slide-out room 102 upwards and downwards.

More specifically, a threaded sprocket 118 at an outer end of the slide-out arm 109 engages the thread of an acme screw 122 that is ultimately fixed to the floor 116 of a slide-out room 102. As a moving member 112 of the slide-out arm 109 is extended or retracted, it causes the sprocket 118 to rotate, moving the acme screw 122, and thus a portion of the slide-out room 102, upwards or downwards.

Figure 2:
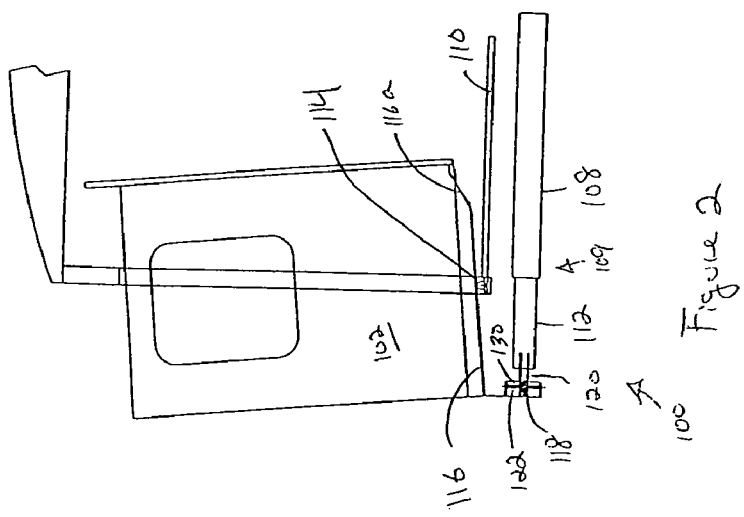
Figure 1:
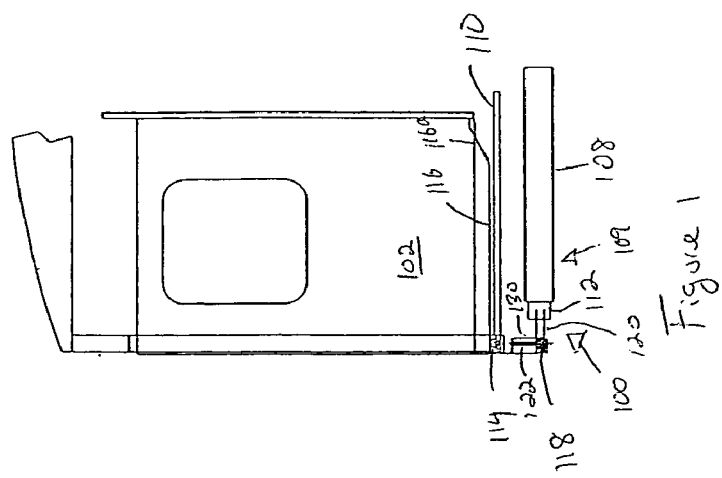

FIGS. 1-3 illustrate the elevation adjusting slide-out mechanism 100 within a vehicle in a retracted, partially extended and fully extended position, respectfully. As seen in FIG. 1, the slide-out room 102 rests on the main floor 110 of the vehicle body when in a fully retracted position. When the slide-out room 102 begins to extend from the vehicle, the elevation of the outer end of the slide-out is decreased, tilting the slide-out room 102 at an angle, as seen in FIG. 2. As the slide-out room 102 moves to a fully extended position in FIG. 3, an angled portion 166a of the slide-out room floor 116 lowers the elevation of the inner end of slide-out room 102. Thus, in a fully extended position, the slide-out room floor 116 is both even and level with the main vehicle floor 110.

FIGS. 4 and 5 illustrate the slide-out arm 109 which comprises a moving member 112 that telescopes into and out of a nonmoving member 108. The nonmoving member 108 is fixed to the body of the vehicle, allowing moving member 112 to extend out from the vehicle. The distal end of the moving member 112 includes a mounting bracket 120 which rotatably mounts an acme sprocket 118.

Both moving member 112 and nonmoving member 108 are preferably composed of tubes, channels, or similar cavity-bearing shapes. Within both members 112 and 108 is a chain 124 having ends anchored at points 125 and 126 within the nonmoving member 108. The chain 124 further engages the acme sprocket 118 at the outer end of the moving member 112 and an idler sprocket 128 at the inner end of the moving member 112. As the moving member 112 telescopes out of the nonmoving member 108, the chain 124 causes the idler sprocket 128 and acme sprocket 118 to rotate.

As best seen in FIGS. 6, 8, and 10, the acme sprocket 118 engages a matching thread on the acme screw 122. The acme screw 122 mounts (non-rotatably) within acme screw bracket 130 which, in turn, is attached to the underside of the slide-out room floor 116. Thus, as the acme sprocket 118 rotates, it moves the acme screw 122 along the matching thread, ultimately moving the acme screw 122 and bracket 130 and floor 116 upward or downward.

For example, FIG. 10 illustrates the acme screw 122 and acme sprocket 118 when the slide-out room 102 is in a completely retracted position. Note that the acme sprocket 118 is positioned near the lower end of the acme screw 122.

FIG. 8 illustrates the acme screw 122 and acme sprocket 118 when the slide-out room 102 is partially extended. The slide-out arm 109 (i.e. the moving member 112 and nonmoving member 108) maintains a constant vertical position during the extension and retraction process, allowing the acme screw 122 to vertically move relative to the slide-out arm 109 and thus the vehicle. In the partially extended position, the acme screw 122 moves vertically lower relative to the acme sprocket 118.

FIG. 6 shows the acme screw 122 and acme sprocket 118 when the slide-out room 102 is fully extended. The acme sprocket 118 is positioned near the top end of the acme screw 122, ultimately supporting the distal end of the slide-out room 102 at a lower vertical position.

The acme screw bracket 130 includes a hinged region 130a which mounts to the underside of the slide-out room floor 116. In this respect, the acme screw 122 maintains a substantially vertical position despite the angled position of the floor 116 during the extension process.

As seen in FIGS. 1-3, 7, and 9, a roller 114 is positioned at the lower edge of the slide-out room opening, supporting some of the weight from the slide-out room. As the slide-out room 102 extends from the vehicle, its distal end moves lower, allowing the full weight of the slide-out room 102 to rest on the roller 114, best seen in FIGS. 2 and 9. The slide-out room floor 116 includes an angled region 116a, seen best in FIGS. 3 and 7, that lowers the elevation of the proximal end of the slide-out room 102 when the slide-out room 102 reaches the fully extended position. This arrangement allows the proximal end of the slide-out room 102 to achieve the same elevation as the distal end of the slide-out room 102 when in a fully extended position. In other words, the angled region 116a allows the slide-out room floor 116 to achieve substantially the same elevation as the main floor 110 of the vehicle.

In operation, the moving member 112 of the slide-out arm 109 begins to extend from the nonmoving member 108, pulling the slide-out room 102 from the vehicle. As the moving member extends, the chain 124 within the slide-out arm 109 moves against the acme sprocket 118 causing the acme sprocket 118 to rotate. The rotating acme sprocket 118 causes the acme screw 122 to move downward through the center of the acme sprocket 118, lowering the height of the distal end of the slide-out room 102. The hinged region 130a of the acme screw bracket 130 flexes as the angle of the slide-out room floor 116 increases. As the slide-out room 102 reaches its fully extended position, the roller 114 meets the ramped portion 116a of the slide-out room floor 116, allowing the proximal end of the slide-out room to lower to an elevation substantially similar to the distal end and the main floor 110 of the vehicle.

The slide-out room 102 may be retracted by a similar but opposite procedure. The moving member 112 moves towards the vehicle while the acme sprocket 118 moves the acme screw 122 and thus the distal end of the slide-out room upward. The ramped portion 116a of slide-out room floor 116 moves over the roller 114, elevating the slide-out room 102 to an increased height. The retraction is complete once the slide-out room 102 moves to a position within the vehicle, best seen in FIG. 1.

The slide-out mechanism 100 may be positioned either above or below the slide-out room 102. Additionally, drive belts and other flexible elements may be used in place of the chain 124. Further, the slide-out arm 109 may be slidably coupled to the inside or outside of the nonmoving member 108.

A typical slide-out room 102 may have one to three or more of theses assemblies, depending on the size and nature of the slide-out room. All of the assemblies are typically driven by a common drive.

FIGS. 11-14 illustrate another preferred embodiment of the present invention, similar to the preferred embodiment described previously in this application. The present embodiment differs in that it includes a motor 160 to change the elevation of the distal end of the slide-out room.

The mounting bracket 120 at the end of the moving member 112 includes a "captured" acme nut 154. Unlike the previously described embodiment, the acme nut 154 is prevented from rotating by the mounting bracket 120. The acme nut 154 includes an inner thread matching and engaging an acme screw 122.

The acme screw 122 is rotatably mounted within acme mounting bracket 130. At the lower portion of the acme screw mounting bracket 130 is a gear box 158 which is coupled to the acme screw 122 and the motor 160. The gear box 158 translates the rotational motion 160 of the motor 160 at 90 degrees to the acme screw 122.

In operation, the preferred embodiment of FIGS. 11-14 functions similarly to the previously described embodiment. However, as the slide-out room extends from or retracts to the vehicle, the motor 160 engages the gear box 158, causing acme screw 122 to rotate. Since the acme nut 154 is prevented from rotating, the turning acme screw 122 moves upward or downward through the acme nut 154. In this respect, the acme screw 122 ultimately adjusts the height of the distal end of the slide-out room through the hingedly connected acme screw mounting bracket 130, similarly to the previous embodiment.

One difference with this embodiment, however, is that there is no mechanical linkage that automatically synchronizes the raising and lower of the distal end with the extension and retraction of the movable member 112. The synchronization can be performed electronically with a controller or can be performed manually by the user.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A slide-out mechanism comprising:
a vehicle having a main floor and a side wall;
an opening for receiving a slide-out room disposed in said side wall;
a slide-out bearing surface disposed on said vehicle at said opening;
a slide-out room having an angled region disposed thereon and engageable with said bearing surface as said slide-out room approaches an extended position;
a moving member disposed on said vehicle at said opening and movable into and out of said vehicle;
an elevation adjuster disposed at one end of said moving member and connected to an end of said slide-out room;
said elevation adjuster, said angled region of said slide-out room floor and said bearing surface of said vehicle configured so as to position said floor of said slide-out room, to an elevation substantially level with said main floor of said vehicle when said slide-out room is in an extended position; and
a control system linked to said elevation adjuster for actively synchronizing said elevation adjuster with movement of said moving member into and out of said vehicle.

2. The slide-out mechanism of claim 1, wherein said slide-out bearing surface is a roller.

3. The slide-out mechanism of claim 1, wherein said angled region of said slide-out room is disposed on a floor of said slide-out room.

4. The slide-out mechanism of claim 1, wherein said elevation adjuster includes an actuator that lowers and raises said end of said slide-out room according to said active synchronization of said control system with movement of said moving member into and out of said vehicle.

5. The slide-out mechanism of claim 4, wherein said control system is comprised of an electric control system.

6. The slide-out mechanism of claim 4, wherein said control system is comprised of a mechanical control system.

7. The slide-out mechanism of claim 4, wherein said actuator includes a sprocket rotatably mounted on said moving member and an acme screw fixedly mounted to an end of said slide out room, said sprocket engagable with said acme screw such that said acme screw is moved vertically upwards and downwards according to a direction of rotation of said sprocket.

8. The slide-out mechanism of claim 7, further comprising a stationary member mounted on said vehicle for receiving said moving member and wherein said actuator further includes a chain for driving said sprocket, said chain having two ends, both of which being fixed to said stationary member.

9. The slide-out mechanism of claim 8, wherein said actuator further includes an idler gear disposed on said moving member at a location opposite said sprocket, said chain extending around both said sprocket and said idler gear.

10. The slide-out mechanism of claim 3, wherein said angled region of said floor is positioned along the inner edge of said floor.

11. The slide-out mechanism of claim 3, wherein said angled region is positioned at a lower proximal edge of said floor of said slide-out room.

12. The slide-out mechanism of claim 4, wherein said actuator comprises:
a non-rotatable acme nut disposed on said moving member;
a rotatable acme screw connected to said slide-out room and in engagement with said acme nut;
an electric motor drivingly connected to said acme screw such that rotation by said motor causes rotation and vertical movement of said acme screw according to a direction of rotation of said motor.

13. A vehicle having a slide-out comprising:
a vehicle body having a main floor and a slide-out room slideably disposed within said vehicle body;
a slide-out arm slideably coupled to said vehicle body;
an elevation adjuster disposed at an outside end of said slide-out arm and connected to an outside end of said slide-out room, said elevation adjuster being operable to raise and lower said outside end of said slide-out room relative to said outside end of said slide-out arm by actively increasing or decreasing respectively a force against said outside end of said slide-out room; and,
a control mechanism coordinating said operation of said elevation adjuster with movement of said slide-out arm into and out of said vehicle body.

14. A vehicle according to claim 13, further comprising a friction reducing mechanism positioned on said vehicle body under said slide-out room.

15. A vehicle according to claim 14, wherein said friction reducing mechanism is a roller positioned near an outer edge of said vehicle body.

16. A vehicle according to claim 13, wherein said slide-out room includes an angled portion at an opposite end of said elevation adjuster such that said slide out room becomes substantially flush with said main floor upon lowering of said outside end of said slide-out room by said elevation adjuster.

17. A vehicle according to claim 16, wherein said control mechanism is an electric controller.

18. A vehicle according to claim 13, wherein said control mechanism is a mechanical controller.

19. A vehicle according to claim 13, wherein said elevation adjuster includes a sprocket rotatably mounted on said slide-out arm and an acme screw fixedly mounted to said outside end of said slide out room, said sprocket engagable with said acme screw such that said acme screw is moved vertically upwards and downwards according to a direction of rotation of said sprocket.

20. A vehicle according to claim 13, wherein said elevation adjuster comprises:
   a non-rotatable acme nut disposed on said slide-out arm;
   a rotatable acme screw connected to said outside end of said slide-out room and in engagement with said acme nut;
   an electric motor drivingly connected to said acme screw such that rotation of said motor causes raising and lowering of said acme screw according to a direction of rotation of said motor.

21. A method of moving a slide-out room relative to a vehicle body comprising:
   providing a slide-out support member movable into and out of said vehicle body;
   providing a slide-out room connected to said support member;
   urging said support member either into or out of said vehicle body;
   changing the elevation of an outside end of said slide-out room relative to said outside end of said support member by adjusting a force on said outside end of said slide-out room, said force having a vertical component; and,
   actively synchronizing said changing of said outside end of said slide-out room relative to said outside end of said support member according to movement of said slide-out support member into and out of said vehicle body.

22. A method according to claim 21, wherein the changing of the elevation occurs during the urging of said support member into or out of said vehicle body.

23. A method according to claim 22, wherein the changing of the elevation occurs after the urging of said support member out of said vehicle body.

24. A method according to claim 22, wherein the changing of the elevation is controlled electronically.

25. A method according to claim 22, wherein the changing of the elevation is controlled mechanically.

26. A method according to claim 22, further comprising changing the elevation of an inside end of said slide-out room such that said slide-out room is substantially flush with a floor on said vehicle body when said slide-out room is extended away from said vehicle body.

27. A slide-out mechanism comprising:
   a vehicle having a main floor and a side wall;
   an opening for receiving a slide-out room disposed in said side wall;
   a slide-out bearing surface disposed on said vehicle at said opening;
   a slide-out room having an angled region disposed thereon and engageable with said bearing surface as said slide-out room approaches an extended position;
   a moving member disposed on said vehicle at said opening and movable into and out of said vehicle;
   an elevation adjuster disposed at one end of said moving member and connected to an end of said slide-out room;
   said elevation adjuster, said angled region of said slide-out room floor and said bearing surface of said vehicle configured so as to position said floor of said slide-out room, to an elevation substantially level with said main floor of said vehicle when said slide-out room is in an extended position;
   wherein said elevation adjuster includes an actuator that automatically lowers and raises said end of said slide-out room according to movement of said moving member into and out of said vehicle; and,
   wherein said actuator includes a sprocket rotatably mounted on said moving member and an acme screw fixedly mounted to an end of said slide out room, said sprocket engagable with said acme screw such that said acme screw is moved vertically upwards and downwards according to a direction of rotation of said sprocket.

28. A vehicle having a slide-out comprising:
   a vehicle body having a main floor and a slide-out room slideably disposed within said vehicle body;
   a slide-out arm slideably coupled to said vehicle body;
   an elevation adjuster disposed at an outside end of said slide-out arm and connected to an outside end of said slide-out room, said elevation adjuster being operable to raise and lower said outside end of said slide-out room relative to said outside end of said slide-out arm;
   wherein said elevation adjuster includes a sprocket rotatably mounted on said slide-out arm and an acme screw fixedly mounted to said outside end of said slide out room, said sprocket engagable with said acme screw such that said acme screw is moved vertically upwards and downwards according to a direction of rotation of said sprocket.

* * * * *